United States Patent
Kamakura et al.

[11] Patent Number: 5,953,158
[45] Date of Patent: Sep. 14, 1999

[54] WATER DROPLET REMOVING SYSTEM FOR VEHICLE

[75] Inventors: Hiroshi Kamakura; Choji Sakuma; Hironori Yamaguchi; Kouzou Shimamura, all of Wako, Japan

[73] Assignee: Honda Giken Kogyo Kabushiki Kaisha, Tokyo, Japan

[21] Appl. No.: 09/082,317

[22] Filed: May 21, 1998

[30] Foreign Application Priority Data

May 22, 1997 [JP] Japan ................................. 9-131844
May 22, 1997 [JP] Japan ................................. 9-131845
May 23, 1997 [JP] Japan ................................. 9-133220

[51] Int. Cl.[6] .......................... B60R 1/06; G02B 7/18; B60S 1/56
[52] U.S. Cl. .................. 359/509; 359/507; 359/841; 359/872; 15/250.003; 454/123; 454/124
[58] Field of Search .................... 359/507, 508, 359/509, 512, 841, 871, 872; 15/250.003; 296/146.1; 454/123, 124

[56] References Cited

U.S. PATENT DOCUMENTS

| | | | |
|---|---|---|---|
| 3,859,899 | 1/1975 | Mills | 359/509 |
| 3,877,780 | 4/1975 | Taylor | 359/509 |
| 4,439,013 | 3/1984 | Hagn et al. | 359/509 |
| 4,963,011 | 10/1990 | Lu et al. | 359/509 |
| 5,179,470 | 1/1993 | Olson | 359/509 |

FOREIGN PATENT DOCUMENTS

| | | | |
|---|---|---|---|
| 81249 | 4/1986 | Japan | 359/507 |
| 6-65126 | 9/1994 | Japan . | |
| 2152889 | 8/1985 | United Kingdom | 359/872 |

*Primary Examiner*—Ricky D. Shafer
*Attorney, Agent, or Firm*—Armstrong, Westerman, Hattori, McLeland & Naughton

[57] ABSTRACT

A water droplet removing system for a vehicle provided with door mirror assemblies each having a door mirror base attached to a door body, and a mirror unit guides air discharged by a blower installed in a door body of the automobile to at least either the surface of a mirror included in the mirror unit or the outer surface of a side window to blow off water droplets wetting the surface of the mirror or the outer surface of the side window. The blower is installed in a dead space defined in front of a guide rail placed in the door body to guide the front edge of the side window for vertical movement in the door body so that the interference between the blower and parts arranged within the door body including the side window can be avoided.

9 Claims, 10 Drawing Sheets

WATER DROPLET REMOVING SYSTEM FOR VEHICLE

BACKGROUND OF THE INVENTION

1. Field of the Invention

The present invention relates to a water droplet removing system for removing water droplets from the mirror of a door mirror assembly and such of an automobile.

1. Description of the Related Art

In a method of removing water droplets wetting the mirror of a door mirror assembly attached to a door of an automobile, air is blown against the mirror to blow water droplets off the mirror. In most water droplet removing systems for carrying out such a method, a blower serving as air source is attached to a door body at a position near a door mirror assembly.

A water droplet removing system disclosed in, Japanese Laid-Open Utility Model No. 6-65126 employs a blower having an impeller driven by a motor. This blower is large in size and is disposed on a central section of a door panel. A space for receiving a side window must be available in a door body, and some parts including those of a window regulator are arranged in the door. Therefore, if the large blower is disposed in a central section of the door body, it is difficult to prevent the interference of the blower with the side window and the parts disposed in the door body. Consequently, special contrivance must be incorporated into the door, the construction of the door becomes inevitably complicated and the size of the door body increases.

SUMMARY OF THE INVENTION

Accordingly, it is an object of the present invention to provide a water droplet removing system for a vehicle, having a blower disposed utilizing a dead space in a door body so that the blower may not interfere with a side window and other parts of the vehicle arranged inside the door body.

With the foregoing object in view, the present invention provides a water droplet removing system for a vehicle including a blower disposed in a door body and a door mirror assembly having a mirror unit and a door mirror base attached to the door body provided with an air passage for guiding air discharged from the blower at least to either a mirror surface of the mirror unit or an outer surface of a side window to blow off water droplets wetting the mirror surface or the outer surface, wherein the blower is installed in a space defined in front of a guide rail placed in the door body to guide a front edge of the side window for vertical movement.

Since the space extending in front of the guide rail for guiding the front edge of the side window for vertical movement is a dead space and the blower is installed in the dead space, the blower will not interfere with the side window and devices arranged in the door body, and the size of the door body need not be increased.

The blower may be installed in an upper section of the space defined in front of the guide rail in the door body. The upper section of the space defined in front of the guide rail is not occupied and near the door mirror assembly. Therefore, the blower can be disposed near an air inlet through which air flows into the door mirror assembly so that an air passage between the blower and the air inlet may be short and, consequently, pressure loss of air flow can be reduced and air can be efficiently blown.

The blower may be a turboblower. The capacity of a turboblower is large for its size, and a turboblower having a necessary capacity can be installed in a limited space extending in front of the guide rail without affecting the layout of other devices.

In the water droplet removing system, the mirror unit is supported for turning on a support part projecting from an upper part of the door mirror base over the mirror unit, an air passage connected to the blower is formed in a lower part of the door mirror base, and air outlets are formed in a middle part of the door mirror base. Since the mirror unit is supported for turning on the support part projecting from an upper part of the door mirror base and extending over the mirror unit, the air passage can be formed in a sufficiently large cross-sectional area in a lower part of the door mirror base without being obstructed by a support mechanism for pivotally supporting the mirror unit. Thus, the water droplet removing system has a simple construction and an excellent water droplet removing capability.

The air outlets formed in a middle part of the door mirror base are on the same level as the mirror unit, and hence air can be properly blown to remove water droplets from the mirror of the mirror unit.

The support part has a support shaft vertically projecting from its lower surface, and a base part of the mirror unit is supported on the support shaft so that the mirror unit is able to turn on the support shaft. Thus, the mirror unit can be supported for turning simply by putting the base part of the mirror unit on the support shaft of the support part.

The air outlets may include a first air outlet formed so as to blow air backward along the outer surface of the side window, and a second air outlet opening toward the surface of the mirror of the mirror unit as set in a retracted state. Water droplets wetting the outer surface of the side window can be removed from the outer surface of the side window by air blown through the first air outlet, and water droplets wetting the surface of the mirror of the mirror unit can be removed from the surface of the mirror of the mirror unit by air blown through the second air outlet.

The door mirror base of the door mirror assembly may be provided therein with a first air passage for guiding air toward the door mirror assembly, and a second air passage for guiding air toward the side window, and the first and the second air passage may be integrally and contiguously formed.

The appearance of the door mirror assembly is not spoiled by the air passage because the air passage is formed in the door mirror base, and the water droplet removing system needs a relatively small number of parts and can be easily assembled because the first air passage for guiding air toward the door mirror assembly and the second air passage for guiding air toward the side window are formed contiguously in the door mirror base of the door mirror assembly.

The outlet end of the first air passage may face the surface of the mirror of the mirror unit set in a retracted state, and the mirror unit may be provided with an air passage to be connected to the outlet end of the first air passage when the mirror unit of the door mirror assembly is set in a working state to guide air toward the surface of the mirror of the mirror unit.

Since the mirror unit of the door mirror assembly is provided with the air passage connected to the outlet end of the first air passage to guide air toward the surface of the mirror of the mirror unit when the mirror unit is set in the working state, air can be smoothly blown through the first air passage against the surface of the mirror of the mirror unit without being affected by relative wind for the efficient removal of water droplets from the mirror of the mirror unit of the door mirror assembly.

BRIEF DESCRIPTION OF THE DRAWINGS

The above and other objects, features and advantages of the present invention will become more apparent from the following description taken in connection with the accompanying drawings, in which:

FIG. 4 is an exploded perspective view of the door mirror assembly similar to FIG. 3 but taken from a direction different from a direction from which FIG. 3 is taken;

FIG. 18 is an exploded perspective view of the door mirror assembly similar to FIG. 17 but taken from a direction different from a direction from which FIG. 17 is taken;

DESCRIPTION OF THE PREFERRED EMBODIMENTS

Figure 1:
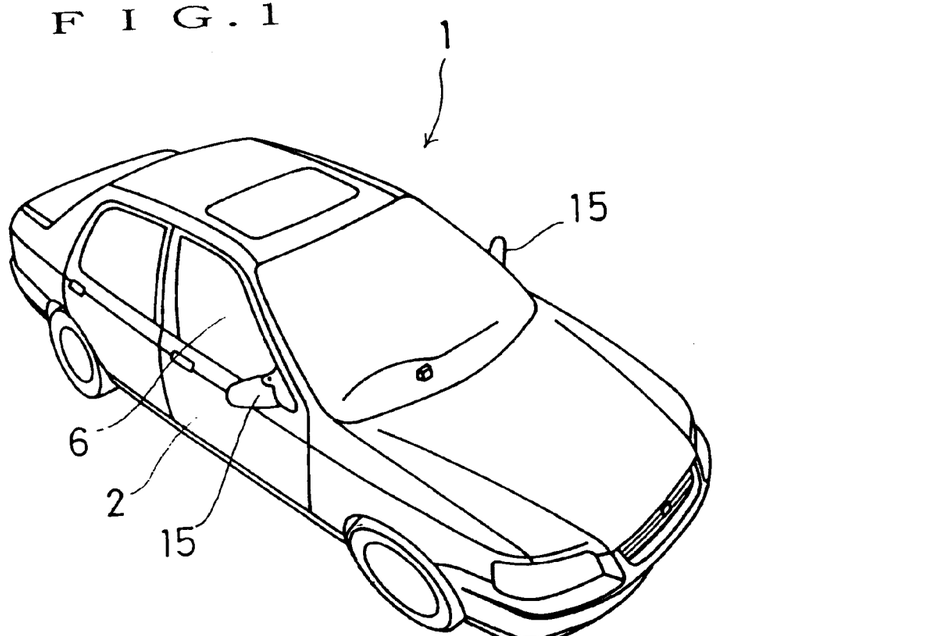
FIG. 1 is a perspective view of a four-wheel automobile provided with water droplet removing systems in a first embodiment according to the present invention.
Figure 2:
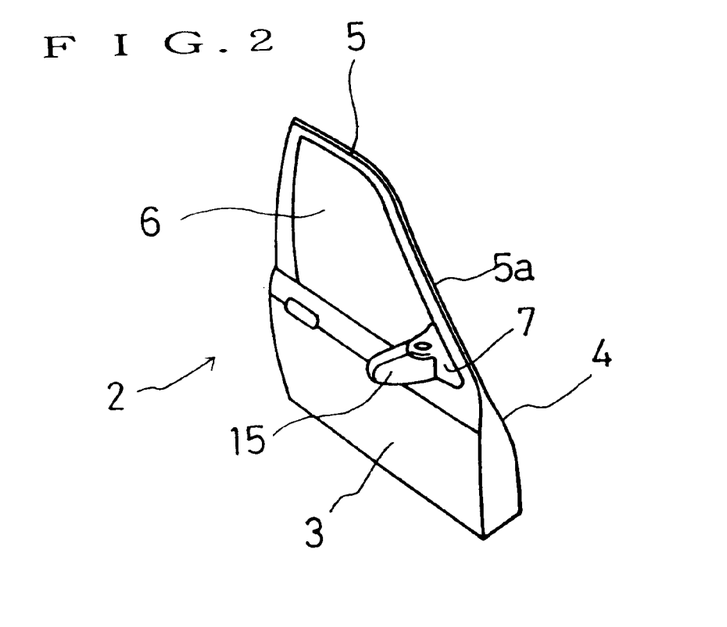
FIG. 2 is a perspective view of a right front door.

FIG. 1 shows a four-wheel automobile 1 provided with water droplet removing systems in a first embodiment according to the present invention. The four-wheel automobile 1 is a four-door sedan having right and left front doors 2 each provided with a door mirror assembly comprising a door mirror base 7 and a mirror unit 15. As shown in FIG. 2, the front door 2 has a lower half part in which an outer panel 3 and an inner panel 4 are disposed opposite to each other so as to define a space in the lower half part of the front door 2, and an upper half part in which a window sash 5 for a side window 6 is formed. The door mirror base 7 of the door mirror assembly is disposed in a triangular corner at the front end of an inclined front section 5a of the window sash 5. The mirror unit 15 is supported for turning between a working position and a retracted position on the door mirror base 7.

Figure 3:
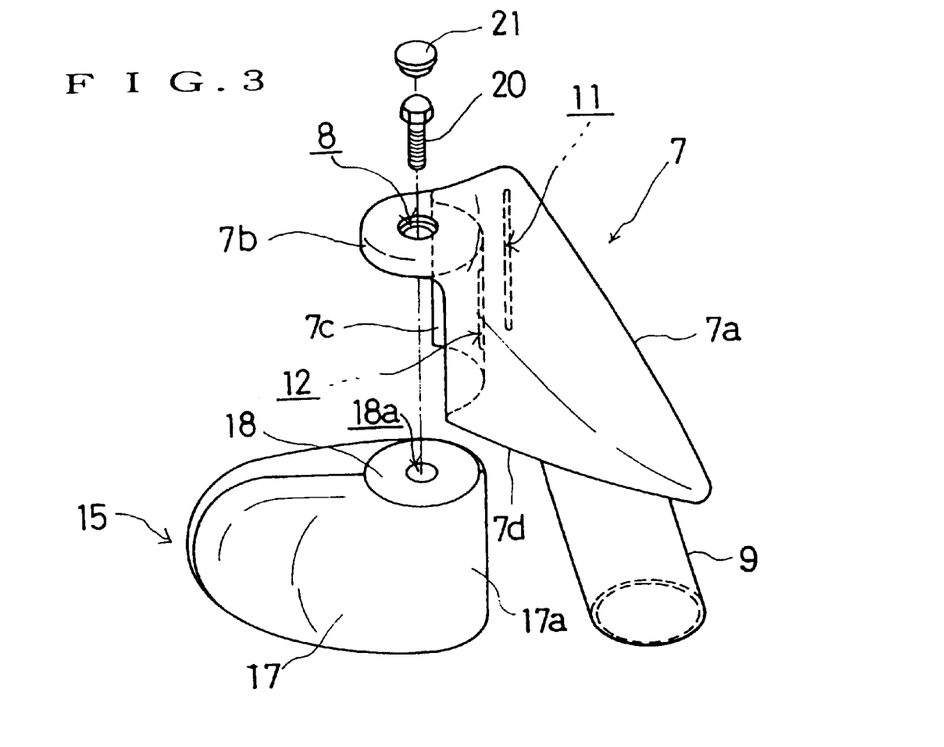
FIG. 3 is an exploded perspective view of a door mirror assembly to which the water droplet removing system in the first embodiment is applied.
Figure 4:
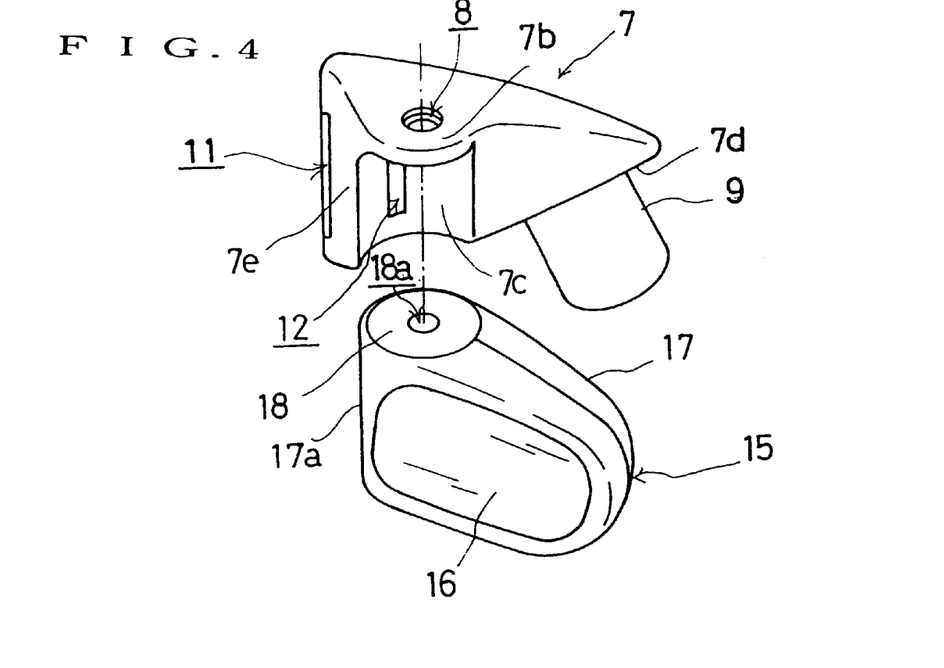

Referring to FIGS. 3 and 4, the door mirror base 7 is a generally triangular hollow structure comprising a flat, triangular inner wall 7a, a bottom wall 7d, a back wall 7e, and an outer wall having an upper part protruding outward in a support bracket 7b and a concave, cylindrical wall 7c vertically extending under the support bracket 7b. A hole 8 having a vertical axis is formed in the support bracket 7b. The surface of the concave, cylindrical wall 7c is a part of a circular cylinder coaxial with the hole 8.

An air duct 9 extend downward from the bottom wall 7d. A vertical, elongate first air outlet 11 is formed in the back wall 7e so as to extend along the inner wall 7a to blow air backward. A short, vertical second air outlet 12 is formed at a predetermined position in the concave, cylindrical wall 7c. Air flowing through the air duct 9 can be blown out through the first air outlet 11 and the second air outlet 12.

The mirror unit 15 comprises a substantially rectangular, laterally elongate mirror 16 and a laterally elongate mirror housing 17 holding the mirror 16 at its peripheral edge so as to cover the mirror 16 from behind. A bearing 18 is embedded in one end part of an upper wall of the mirror housing 17. The bearing 18 comprises an inner ring having a vertical center axis, and an outer ring capable of turning relative to the inner ring. A threaded hole 18a is formed in the center of the inner ring. The mirror housing 17 has a convex, cylindrical base end wall 17a having a cylindrical surface coaxial with the bearing 18.

The mirror unit 15 is combined with the door mirror base 7 by fitting the convex, cylindrical base end wall 17a of the mirror housing 17 in a cylindrical recess defined by the concave, cylindrical wall 7c so that the bearing 18 of the mirror housing 17 is positioned near and below the support bracket 7b of the door mirror base 7 and the threaded hole 18a of the bearing 18 is aligned with the hole 8 of the support bracket 7b. The mirror unit 15 is supported for turning on the support bracket 7b by inserting a pivot bolt 20 from above the support bracket 7b in the hole 8, and screwing the pivot bolt 20 in the threaded hole 18a. Thus, the mirror unit 15 is supported for turning on the support bracket 7b by the pivot bolt 20. A recess is formed at the upper end of the hole 8 of the support bracket 7b, and a cap 21 is fitted in the recess to conceal the head of the pivot bolt 20. When the mirror unit 15 is turned, the convex, cylindrical base end wall 17a of the mirror housing 17 slides along the concave, cylindrical surface of the concave, cylindrical wall 7c of the door mirror base 7.

Figure 5:
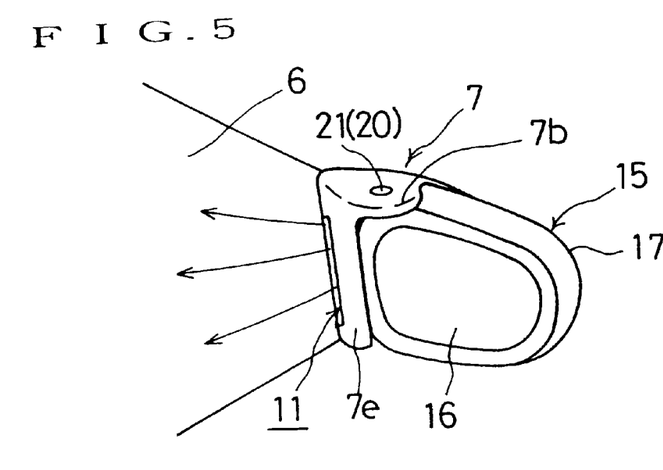
FIG. 5 is a perspective view of the door mirror assembly set in a working state.
Figure 6:
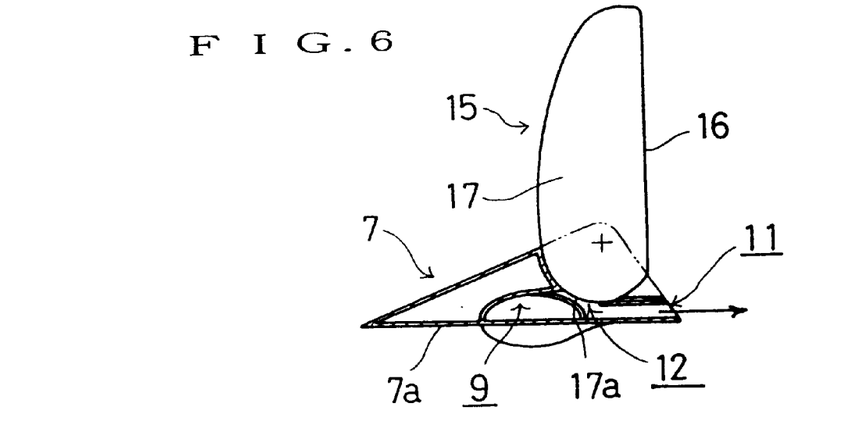
FIG. 6 is a partly sectional view of the door mirror assembly set in the working state.
Figure 7:
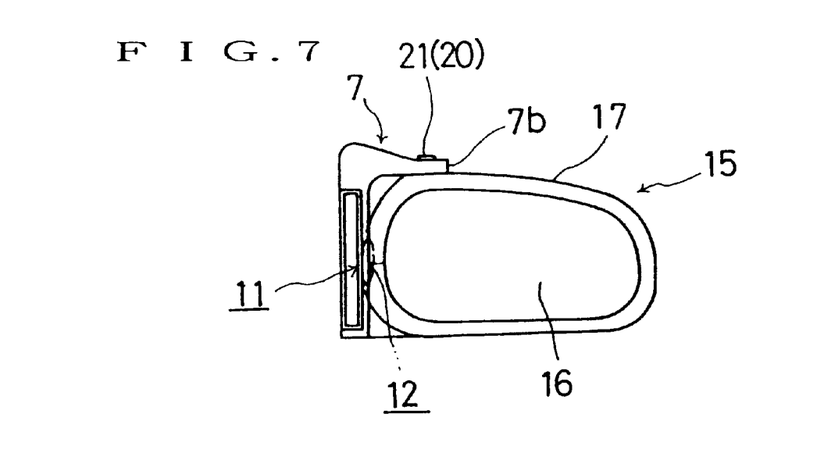
FIG. 7 is a rear view of the door mirror assembly set in the working state.

Referring to FIGS. 5 to 7 showing the mirror unit 15 set in its working state, the second air outlet 12 formed in the concave, cylindrical wall 7c of the door mirror base 7 is closed by the convex, cylindrical base end wall 17a of the mirror housing 17, and only the first air outlet 11 formed in the back wall 7e is open. Therefore, air blown through the first air outlet 11 along the outer surface of the side window 6 is able to remove water droplets from the side window 6.

Figure 8:
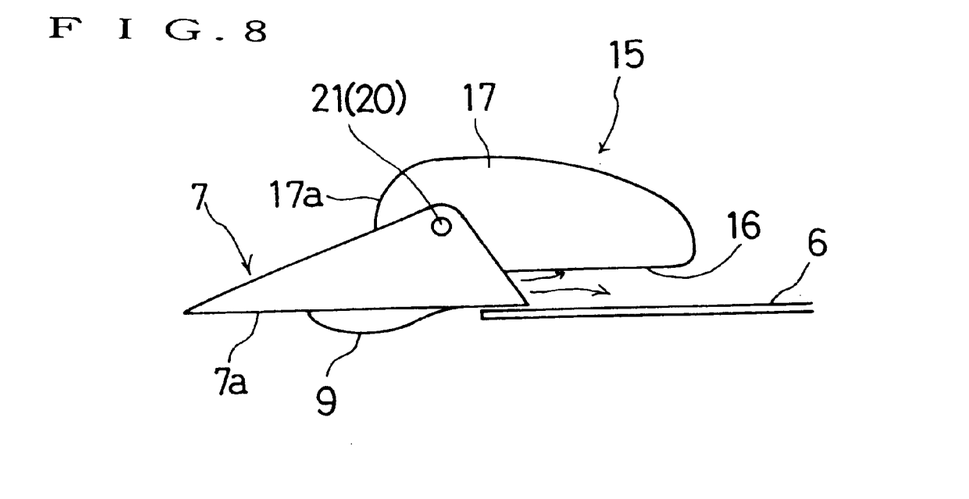
FIG. 8 is a top plan view of the door mirror assembly set in the retracted state.
Figure 9:
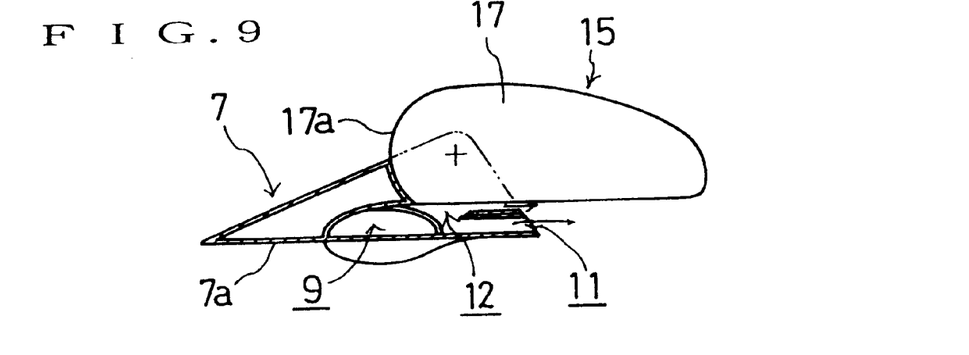
FIG. 9 is a partly sectional view of the door mirror assembly set in the retracted state.
Figure 10:
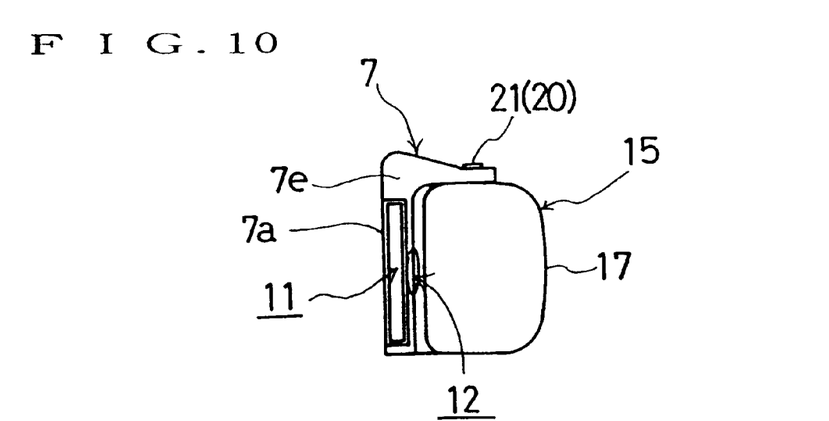
FIG. 10 is a rear view of the door mirror assembly set in the retracted state.

Referring to FIGS. 8 to 10 showing the mirror unit 15 set in its retracted state, the convex, cylindrical base end wall 17a is turned away from the second air outlet 12 of the door mirror base 7 to open the second air outlet 12. The mirror 16 is disposed opposite to the second air outlet 12 with a small space formed between the mirror 16 and the second air outlet 12 in parallel to the side window 6. Therefore, air blown through the second air outlet 12 is able to remove water droplets from the mirror 16.

Figure 11:
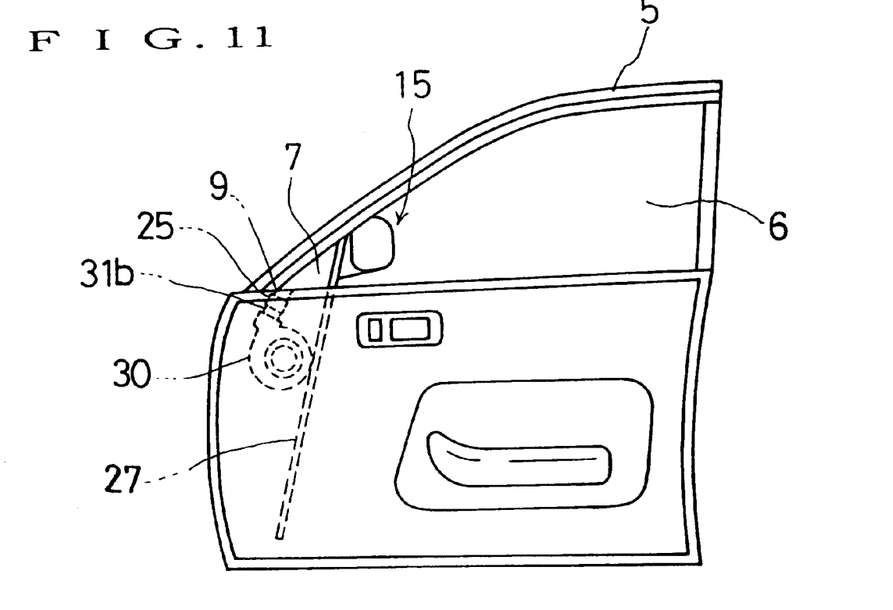
FIG. 11 is a side view of the right front door as viewed from the inner side of the right front door.

As shown in FIG. 11, the outer panel 3 and the inner panel 4 of the front door 2 form a door body. A turboblower 30 is disposed in the door body at a position in a front upper section of the door body below the door mirror base 7. The discharge opening 31b of the turboblower 30 is connected to the air duct 9 extending downward from the door mirror base 7 by a connecting pipe 25 to supply air from the turboblower 30 to the door mirror base 7. A guide rail 27 for guiding the side window 6 for upward and downward movement is disposed inside a front section of the door body in an oblique position slightly inclined to a vertical. The guide rail 27 has an upper end located near the rear end of the door mirror base 7, and extends straight from the upper end thereof obliquely forward and downward at a small inclination to a vertical. The turboblower 30 is disposed in an upper section of a dead space extending between the guide rail 27 and the front edge of the door body as shown in FIG. 11.

Figure 12:
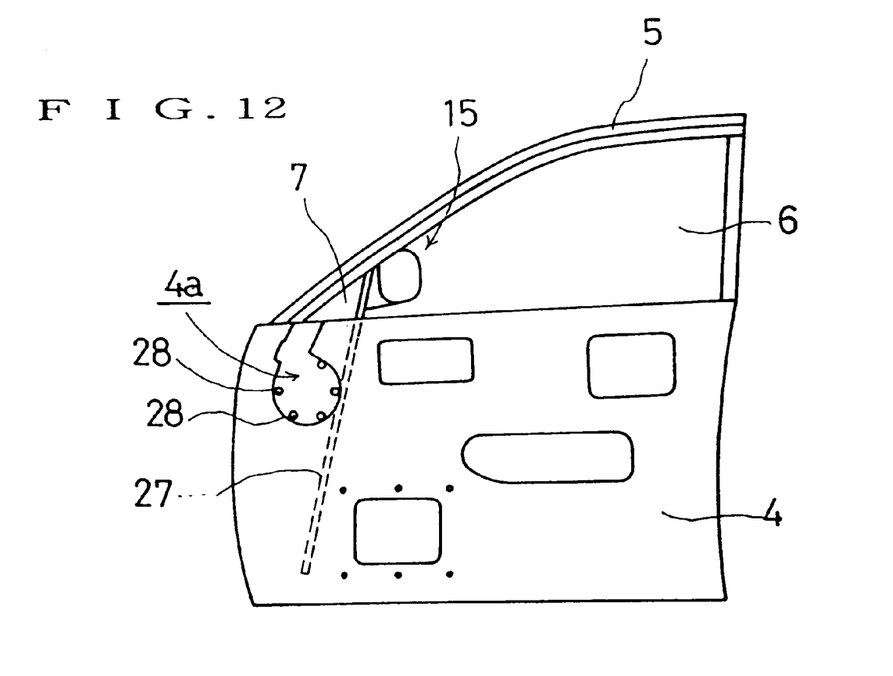
FIG. 12 is a side view of an inner panel included in the right front door.
Figure 15:
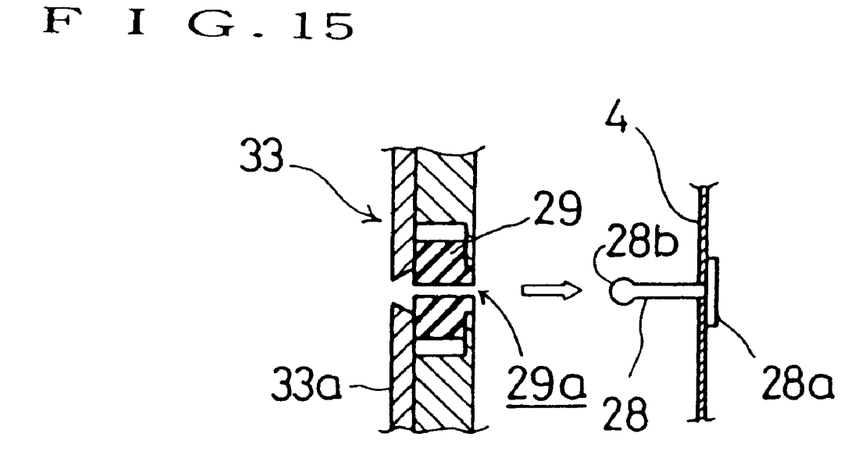
FIG. 15 is a sectional view of assistance in explaining a process of bringing a bracket formed on the periphery of the turboblower of FIG. 13 into engagement with a retaining pin attached to the bottom surface of a recess formed in the inner panel of the right front door.
Figure 16:
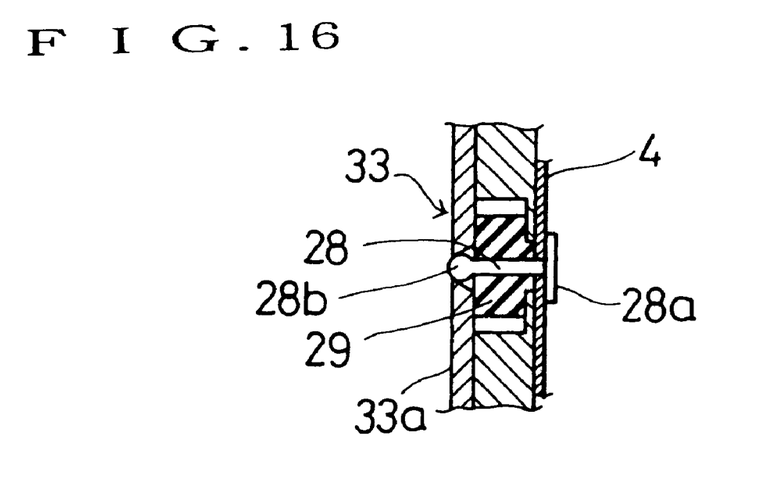
FIG. 16 is a sectional view of the bracket formed on the periphery of the turboblower in engagement with the retaining pin.

As shown in FIG. 12, the inner panel 4 is provided in a front part thereof on the front side of a part corresponding to the guide rail 27 with a generally circular recess 4a conforming the contour of the casing 31 of the turboblower 30. A plurality of retaining pins 28 are fixed to the bottom wall of the recess 4a at predetermined positions on a peripheral part of the bottom wall. As shown in FIG. 15, each retaining pin 28 is set on a base 28a and has an expanded head 28b. The retaining pin 28 penetrates the inner panel 4, and the base 28a is welded to the inner panel 4 to hold the retaining pin 28 in place on the inner panel 4.

Figure 13:
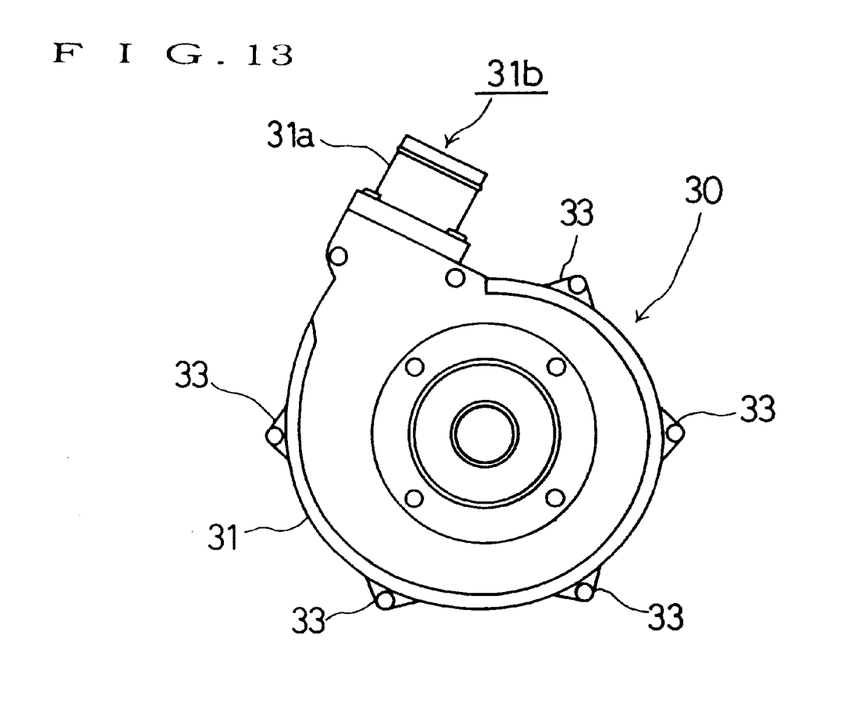
FIG. 13 is a side view of a turboblower.
Figure 14:
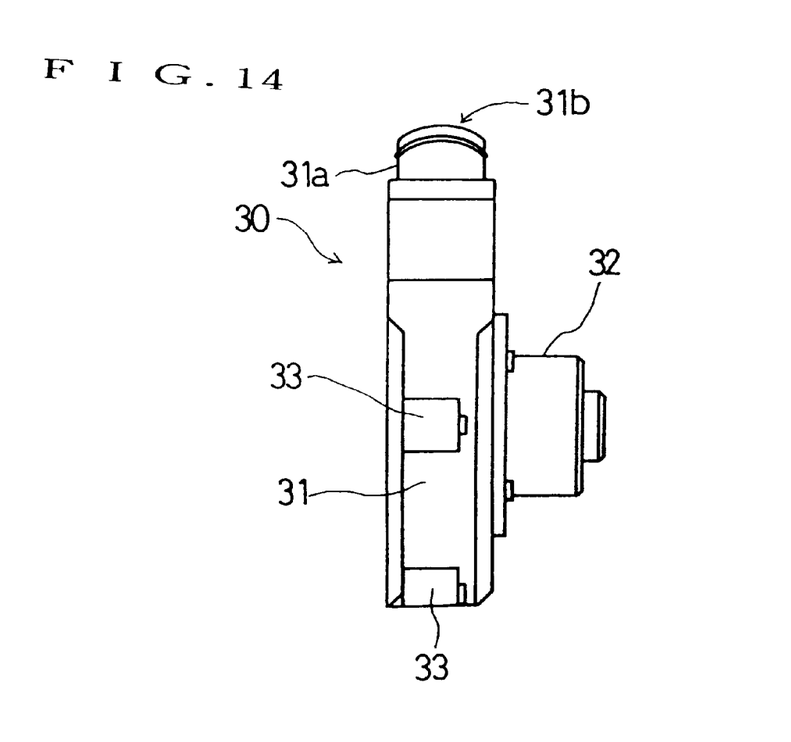
FIG. 14 is a front view of the turboblower of FIG. 13.

Referring to FIGS. 13 and 14, the turboblower 30 has a flat casing 31 substantially circular in a side view. A motor 32 is attached to the outer surface of one side plate of the casing 31. A discharge pipe 31a having a discharge opening 31b extends from the casing 31 in a direction tangent to the circumference of the casing 31. A plurality of brackets 33 project from the outer circumference of the casing 31. As shown in FIG. 15, a rubber bushing 29 is fitted in a circular hole formed in each bracket 33 and held in place by a holding member 33a. A small hole 29a formed in a central part of the rubber bushing 29 corresponds to the retaining pin 28 held in place in the recess 4a of the inner panel 4. The turboblower 30 is placed in the recess 4a of the inner panel 4 so that the retaining pins 28 held in place on the bottom wall of the recess 4a are fitted in the small holes 29a of the rubber bushings 29 and the expanded heads 28b of the retaining pins 28 penetrate the rubber bushings 29, respectively, to hold the turboblower 30 through the rubber bushings 29 in the recess 4a of the inner panel 4. The turboblower 30 can be attached to the inner panel 4 by a simple, single action to fit the turboblower 30 in the recess 4a of the inner panel 4. Thus, the turboblower 30 can be attached to the inner panel 4 by a simple work, which improves the efficiency of assembling work. Although the turboblower 30 is thus attached to the inner panel 4 by a simple arrangement by an easy assembling work, vibrations generated by the turboblower 30 can be absorbed because the turboblower 30 is supported through the rubber bushings 29 on the inner panel 4.

The discharge opening 31b of the turboblower 30 is connected to the air duct 9 extending downward from the door mirror base 7 by the connecting pipe 25, and the inner panel 4 is covered with a door trim board. Since the turboblower 30 is disposed in the dead space extending in front of the guide rail 27 in the door body, the turboblower 30 does not interfere with the side window 6, a window regulator and such, and the door body need not be enlarged. Since the turboblower 30 is disposed in an upper section of the dead space extending in front of the guide rail 27, the turboblower 30 can be disposed close to the door mirror base 7, the discharge opening 31b of the turboblower 30 can be connected to the air duct extending from the door mirror base 7 by the relatively short connecting pipe 25. Therefore, air can be efficiently delivered to the door mirror base 7 at a low pressure loss. The turboblower 30 has a large capacity for its size and the turboblower 30 having a necessary capacity can be installed in the narrow space extending in front of the guide rail 27 without affecting the layout of other devices.

When the mirror unit 15 is set in its working state, the second air outlet 12 of the door mirror base 7 is closed by the mirror housing 17, and air is blown only through the first air outlet 11 against the side window 6 to use all the air discharged by the turboblower 30 for removing water droplets from the side window 6. Therefore, water droplets can be satisfactorily removed from the side window even if the turboblower 30 is a small, lightweight one. When the mirror unit 15 is set in its retracted state, the mirror housing 17 is moved away from the second air outlet 12 to blow air against the mirror 16. Therefore, air blown through the second air outlet 12 is able to remove water droplets from the mirror 16.

The air discharged by the turboblower 30 is distributed to both the first air outlet 11 and the second air outlet 12 and hence all the air discharged by the turboblower 30 is not blown through the second air outlet 12 against the mirror 16. However, the quantity of air distributed to the second air outlet 12 is sufficient for removing water droplets from the mirror 16.

Water droplets wetting the surface of the mirror 16 are removed while the mirror unit 15 is in the retracted state and hence the surface of the mirror 16 will have been cleared of water droplets before the mirror unit 15 will be set in the working state to prepare the automobile for traveling.

The turboblower 30 has a small size and a large capacity and water droplets can be efficiently and quickly removed from the surface of the mirror 16.

The support bracket 7b supporting the mirror unit 15 for turning projects from an upper part of the door mirror base 7 so as to overhang the mirror unit 15. Therefore, the air duct 9 can be easily formed so as to extend downward from the door mirror base 7 near the turboblower 30 without interfering with parts forming a support mechanism for supporting the mirror unit 15 in a sufficient cross-sectional area and in a simple construction. Consequently, a sufficient quantity of air can be used for a high water droplet removing effect.

The first air outlet 11 and the second air outlet 12 formed in a middle part of the door mirror base 7 are on substantially the same level as the mirror 16 of the mirror unit 15, and hence air can be properly blown to remove water droplets from the mirror 16 of the mirror unit 15.

Since the turboblower 30 is installed below the door mirror base 7 in the door body, the turboblower 30 can be disposed near the door mirror base 7, the air duct 9 extending from the door mirror base 7 and the connecting pipe 25 may be short and air can be efficiently delivered to the door mirror base 7 at a low pressure loss.

Air is distributed through the air passages formed in the door mirror assembly and any tubes or the like are not used for distributing air, and the air duct 9 will not spoil the appearance of the door mirror assembly because the air duct 9 is concealed.

A water droplet removing system in a second embodiment according to the present invention will be described hereinafter with reference to FIGS. 17 to 21. The water droplet removing system in the second embodiment employs a door mirror assembly different in construction from that employed in the first embodiment, and is the same in other respects as the water droplet removing system in the first embodiment.

Figure 17:
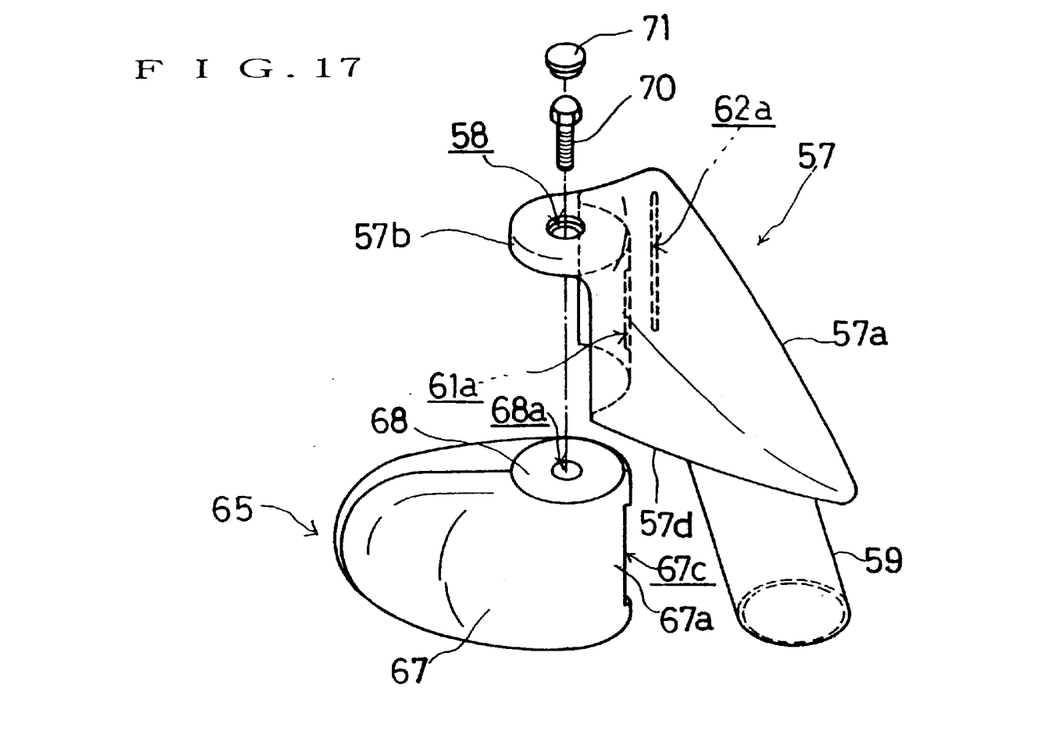
FIG. 17 is an exploded perspective view of a door mirror assembly to which a water droplet removing system in a second embodiment according to the present invention is applied.
Figure 18:
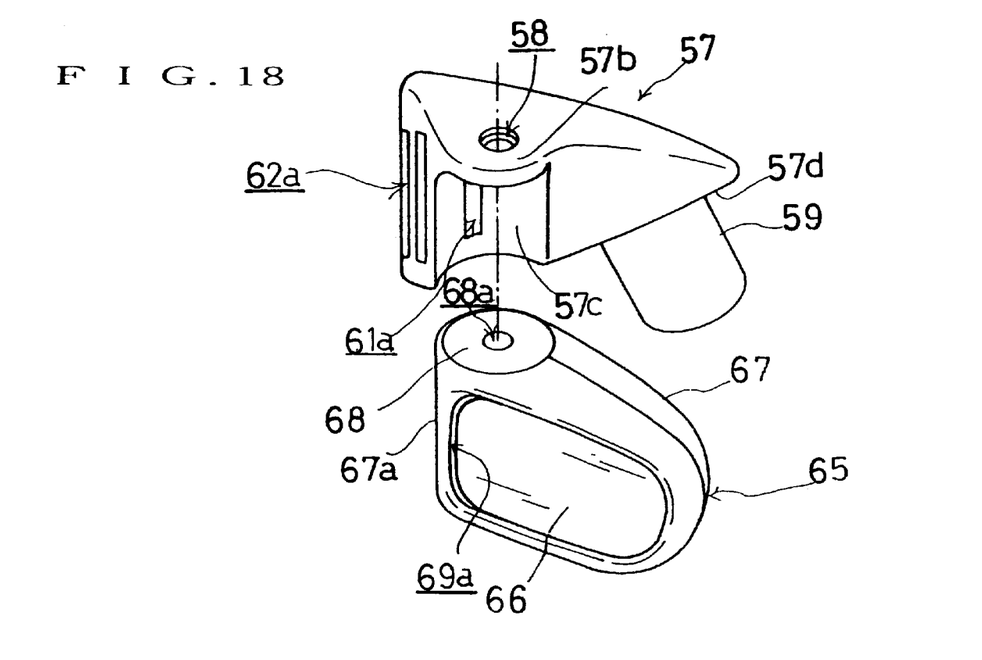
Figure 19:
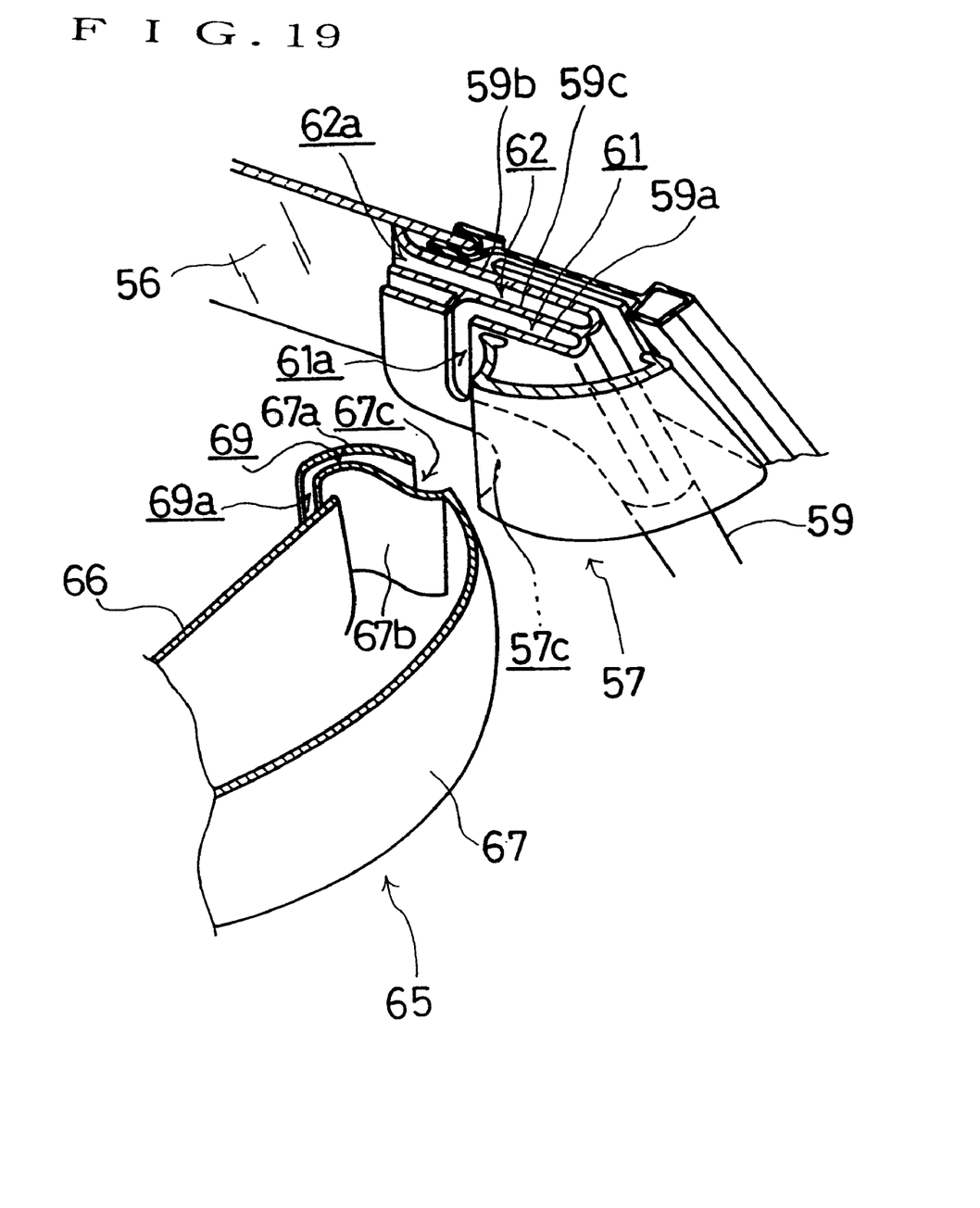
FIG. 19 is a sectional exploded perspective view of the door mirror assembly of FIG. 17 taken on a horizontal plane.

Referring to FIGS. 17 to 19, a door mirror assembly comprises a door mirror base 57 and a mirror unit 65. The door mirror base 57 is a generally triangular hollow structure having a flat, triangular inner wall 57a, a bottom wall 57d, and an outer wall having an upper part protruding outward in a support bracket 57b and a concave, cylindrical wall 57c vertically extending under the support bracket 57b. A hole 58 having a vertical axis is formed in the support bracket 57b. The surface of the concave, cylindrical wall 57c is a part of a circular cylinder coaxial with the hole 58. As shown in FIG. 19, an air duct 59 is fitted from below in an opening formed in the bottom wall 57d. An end part of the air duct 59 projecting into the door mirror base 57 has the shape of a flat tube having an outer wall 59a and an inner wall 59b and extends rearward. A partition wall 59c is extended in parallel to the walls 59a and 59b in a space between the walls 59a and 59b to define a first air passage 61 and a second air passage 62. Thus the air duct 59 has one upstream air passage branched in the end part of the air duct 59 into the first air passage 61 and the second air passage 62, and the first air passage 61 and the second air passage 62 are directed rearward. The partition wall 59c serves both as one of the walls defining the first air passage 61 and one of the walls defining the second air passage 62. The outer wall 59a extends rearward along the concave, cylindrical surface of the concave, cylindrical wall 57c. A first air outlet 61a connected to the first air passage 61 is formed in a vertical slot in a part of the outer wall 59a slightly behind the concave cylindrical wall 57c. The first air passage 61 is closed behind the air outlet 61a to blow air through the air outlet 61a. The second air passage 62 defined by the inner wall 59b and the partition wall 59c extends rearward and is connected to an air outlet 62a having the shape of a vertical slot and opening toward the rear. The inner wall 59b is included in a plane parallel to a side window 56 and spaced a short distance apart from the outer surface of the side window 56. A rear end part of the inner wall 59b is curved toward the side window 56 so that the edge of the rear end part lies near a front end part of the side window 56.

The mirror unit 65 comprises a substantially rectangular, laterally elongate mirror 66 and a laterally elongate mirror housing 67 holding the mirror 16 at its peripheral edge so as to cover the mirror 66 from behind. A bearing 68 is embedded in one end part of an upper wall of the laterally elongate mirror housing 67. The bearing 68 comprises an inner ring having a vertical center axis, and an outer ring capable of turning relative to the inner ring. A threaded hole 68a is formed in the center of the inner ring. The mirror housing 67 has a convex, cylindrical base end wall 67a having a cylindrical surface coaxial with the bearing 68. The convex, cylindrical base end wall 67a is curved so as to extend around an inner end edge of the mirror 66 and provided with a vertical slot 67c.

A guide wall 67b is formed on the inner side of the convex, cylindrical base end wall 67a provided with the slot 67c to define an air passage 69 between a rear end part of the convex, cylindrical base end wall 67a and the guide wall 67b. The air passage 69 curves along the convex, cylindrical base end wall 67a and around the inner edge of the mirror 66, and terminates in an air outlet 69a through which air can be blown along the surface of the mirror 66.

The mirror unit 65 is combined with the door mirror base 57 by fitting the convex, cylindrical base end wall 67a of the mirror housing 67 in a cylindrical recess defined by the concave, cylindrical wall 57c so that the bearing 68 of the mirror housing 67 is positioned near and below the support bracket 57b of the door mirror base 57 and the threaded hole 68a of the bearing 68 is aligned with the hole 58 of the support bracket 57b. The mirror unit 65 is supported for turning on the support bracket 57b by inserting a pivot bolt 70 from above the support bracket 57b in the hole 58, and screwing the pivot bolt 70 in the threaded hole 68a. Thus, the mirror unit 65 is supported for turning on the support bracket 57b by the pivot bolt 70. A recess is formed at the upper end of the hole 58 of the support bracket 57b, and a cap 71 is fitted in the recess to conceal the head of the pivot bolt 70. When the mirror unit 65 is turned, the convex, cylindrical base end wall 67a of the mirror housing 67 slides along the concave, cylindrical surface of the concave, cylindrical wall 57c of the door mirror base 57.

Figure 20:
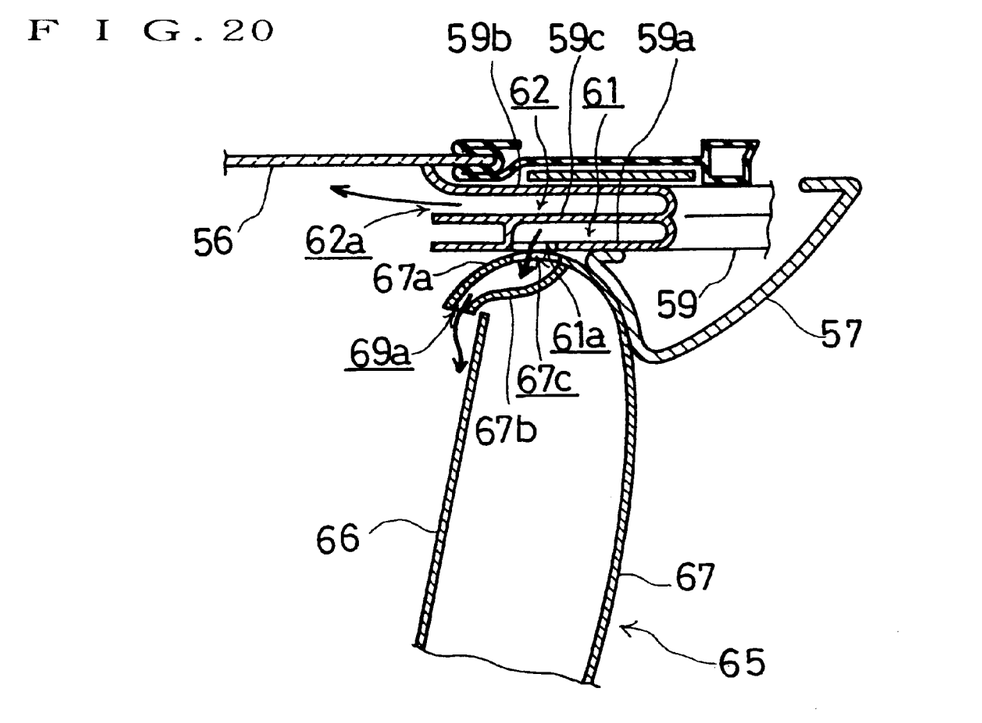
FIG. 20 is a sectional view of the door mirror assembly of FIG. 17 set in a working state.

Referring to FIG. 20 showing the mirror unit 65 set in its working state, the slot 67c formed in the convex cylindrical base end wall 67a of the mirror housing 67 coincides with the air outlet 61a formed in the outer wall 59a in the downstream part of the air duct 59. Accordingly, air flowing through the first air passage 61 flows through the air outlet 61a, the slot 67c and the air passage 69 of the mirror unit 65, and is blown through the air outlet 69a along the surface of the mirror 66 to blow water droplets off the mirror 66. Meanwhile, air flowing through the second air passage 62 is blown through the air outlet 62a opening toward the rear so as to flow along the outer surface of the side window 56 to blow water droplets off the side window 56.

Figure 21:
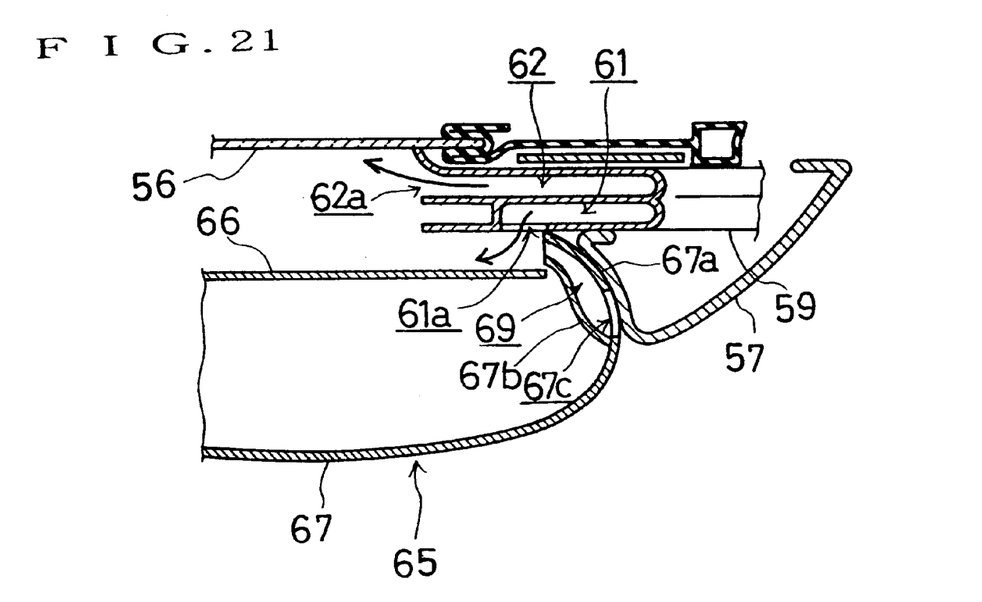
FIG. 21 is a sectional view of the door mirror assembly of FIG. 17 set in a retracted state.

Referring to FIG. 21 showing the mirror unit 65 set in its retracted state, the air outlet 69a of the convex, cylindrical base end wall 67a coincides substantially with the front edge of the air outlet 61a formed in the outer wall 59a of the downstream part of the air duct 59, and the air outlet 61a is open. Therefore, air flowing through the first air passage 61 is blown through the air outlet 61a directly against the surface of the mirror 66 to blow water droplets off the mirror 66. Air flowing through the second air passage 62 is blown through the air outlet 62a opening toward the rear so as to flow along the outer surface of the side window 56 to blow water droplets off the side window 56. Thus, the water droplet removing system in the second embodiment is capable of removing water droplets from both the side window 56 and the surface of the mirror 66 of the mirror unit 65 not only when the mirror unit 65 is set in the working state but also when the same is set in the retracted state. Air is guided by the air passage 69a of the mirror housing 67 of the mirror unit 65 when the mirror unit 65 is set in the working state. Therefore, air can be smoothly blown against the surface of the mirror 66 without being affected by relative wind for the efficient removal of water droplets from the mirror 66 of the mirror unit 65 of the door mirror assembly. Since most parts of the first air passage 61 and the second air passage 62 extend within the door mirror base 57, the appearance of the door mirror assembly is not spoiled by the air passages 61 and 62. Since the first air passage 61 through which air for removing water droplets from the surface of the mirror 66 of the mirror unit 65 flows and the second air passage 62 through which air for removing water droplets from the side window 56 flows are formed integrally with an extension of the air duct 59 in the door mirror base 57, the water droplet removing system needs a relatively small number of parts and requires simple assembling work. Air is supplied into the air duct 59 by a turboblower having a large capacity for its size, and the turboblower is disposed below the door mirror base 57 in an upper front section of a space in the door body of a front door 52, having an outer panel 53 and an inner panel 54. Since the turboblower is disposed near the door mirror base 57, the discharge port of the turboblower can be connected to the air duct 59 by a relatively short air passage, and hence air can be efficiently supplied to the door mirror assembly at a low pressure loss.

Although the invention has been described in its preferred embodiments with a certain degree of particularity, obviously many changes and variations are possible therein. It is therefore to be understood that the present invention may be practiced otherwise than as specifically described herein.

What is claimed is:

1. A water droplet removing system for a vehicle including a blower disposed in a door body and a door mirror assembly having a mirror unit and a door mirror base attached to the door body provided with an air passage for guiding air discharged from the blower at least to either a mirror surface of the mirror unit or an outer surface of a side window to blow off water droplets wetting the mirror surface or the outer surface, wherein the blower is installed in a space defined in front of a guide rail placed in the door body to guide a front edge of a side window for vertical movement.

2. The water droplet removing system according to claim 1, wherein the blower is installed in an upper section of the space defined in front of the guide rail in the door body.

3. The water droplet removing system according to claim 2, wherein the blower is a turboblower.

4. The water droplet removing system according to claim 1, wherein the blower is a turboblower.

5. The water droplet removing system according to claim 1, wherein the mirror unit is supported for turning on a support part projecting from an upper part of the door mirror base so as to overhang the mirror unit, an air passage connected to the blower is formed in a lower part of the door mirror base, and air outlets are formed in a middle part of the door mirror base.

6. The water droplet removing system according to claim 5, wherein the support part has a support shaft vertically projecting from its lower surface, and a base end wall of the mirror unit is supported on the support shaft so that the mirror unit is able to turn on the support shaft.

7. The water droplet removing system according to claim 5, wherein the air outlets include a first air outlet formed so as to blow air backward along the outer surface of the side window, and a second air outlet opening toward the surface of the mirror of the mirror unit as set in a retracted state.

8. The water droplet removing system according to claim 1, wherein the door mirror base of the door mirror assembly is provided therein with a first air passage for guiding air toward the door mirror assembly, and a second air passage for guiding air toward the side window, and the first and the second air passages are formed integrally and contiguously.

9. The water droplet removing system according to claim 8, wherein the outlet end of first air passage faces the surface of the mirror of the mirror unit set in a retracted state, and the mirror unit is provided with an air passage to be connected to the outlet end of the first air passage when the mirror unit of the door mirror assembly is set in a working state to guide air toward the surface of the mirror of the mirror unit.

* * * * *